(12) United States Patent
Blom

(10) Patent No.: US 9,646,315 B2
(45) Date of Patent: May 9, 2017

(54) METHOD AND APPARATUS FOR IMPROVING USER EXPERIENCE WITH AN APPLICATION ACROSS MULTIPLE DEVICES

(75) Inventor: Jan Otto Blom, Lutry (CH)

(73) Assignee: Nokia Technologies Oy, Espoo (FI)

(*) Notice: Subject to any disclaimer, the term of this patent is extended or adjusted under 35 U.S.C. 154(b) by 1171 days.

(21) Appl. No.: 13/543,176

(22) Filed: Jul. 6, 2012

(65) Prior Publication Data
US 2014/0012774 A1    Jan. 9, 2014

(51) Int. Cl.
- G06Q 30/02 (2012.01)
- G06Q 50/00 (2012.01)
- A63F 13/40 (2014.01)
- A63F 13/30 (2014.01)

(52) U.S. Cl.
CPC ............ *G06Q 30/02* (2013.01); *A63F 13/10* (2013.01); *A63F 13/12* (2013.01); *G06Q 50/01* (2013.01)

(58) Field of Classification Search
CPC combination set(s) only.
See application file for complete search history.

(56) References Cited

U.S. PATENT DOCUMENTS

| | | | |
|---|---|---|---|
| 2011/0184899 A1* | 7/2011 | Gadanho et al. | 706/46 |
| 2012/0172025 A1* | 7/2012 | Hamalainen et al. | 455/419 |
| 2013/0072126 A1* | 3/2013 | Topaltzas et al. | 455/67.11 |
| 2013/0301431 A1* | 11/2013 | Izzo et al. | 370/252 |

* cited by examiner

*Primary Examiner* — Mark A Fleischer
(74) *Attorney, Agent, or Firm* — Ditthavong & Steiner, P.C.

(57) ABSTRACT

An approach is provided for identifying and utilizing user experience differential information to improve a user's experience for a given application. The analytics platform determines one or more user experience ratings associated with at least one application, at least one subcomponent of the at least one application, at least one application category, or a combination thereof with respect to one or more device types. The analytics platform processes and/or facilitates a processing of the one or more user experience ratings to determine user experience differential information between the one or more device types.

20 Claims, 9 Drawing Sheets

METHOD AND APPARATUS FOR IMPROVING USER EXPERIENCE WITH AN APPLICATION ACROSS MULTIPLE DEVICES

BACKGROUND

Service providers and device manufacturers (e.g., wireless, cellular, etc.) are continually challenged to deliver value and convenience to consumers by, for example, providing compelling network services. One area of interest has been the development of software applications (e.g., games, social networking applications, web browsers, productivity applications, etc.) that can be used across a wide range of device types (e.g., mobile phones, tablets, personal computers, game consoles, etc.). As a result of differences among the device types (e.g., screen size, form factor, user interface (UI), computational resources, etc.), the user experience of interacting with the same application across multiple device types often differs. However, identifying and utilizing these differences improve the user experience for a given application is problematic. Accordingly, service providers and device manufactures face significant technical challenges in providing a service that identifies and utilizes user experience differential information to improve the user experience associated with an application.

SOME EXAMPLE EMBODIMENTS

Therefore, there is a need for an approach for identifying and utilizing user experience differential information to improve a user's experience for a given application.

According to one embodiment, a method comprises determining one or more user experience ratings associated with at least one application, at least one subcomponent of the at least one application, at least one application category, or a combination thereof with respect to one or more device types. The method also comprises processing and/or facilitating a processing of the one or more user experience ratings to determine user experience differential information between the one or more device types.

According to another embodiment, an apparatus comprises at least one processor, and at least one memory including computer program code for one or more computer programs, the at least one memory and the computer program code configured to, with the at least one processor, cause, at least in part, the apparatus to determine one or more user experience ratings associated with at least one application, at least one subcomponent of the at least one application, at least one application category, or a combination thereof with respect to one or more device types. The apparatus is also caused to process and/or facilitate a processing of the one or more user experience ratings to determine user experience differential information between the one or more device types.

According to another embodiment, a computer-readable storage medium carries one or more sequences of one or more instructions which, when executed by one or more processors, cause, at least in part, an apparatus to determine one or more user experience ratings associated with at least one application, at least one subcomponent of the at least one application, at least one application category, or a combination thereof with respect to one or more device types. The apparatus is also caused to process and/or facilitate a processing of the one or more user experience ratings to determine user experience differential information between the one or more device types.

According to another embodiment, an apparatus comprises means for determining one or more user experience ratings associated with at least one application, at least one subcomponent of the at least one application, at least one application category, or a combination thereof with respect to one or more device types. The apparatus also comprises means for processing and/or facilitating a processing of the one or more user experience ratings to determine user experience differential information between the one or more device types.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for identifying and utilizing user experience differential information to improve a user's experience for a given application are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
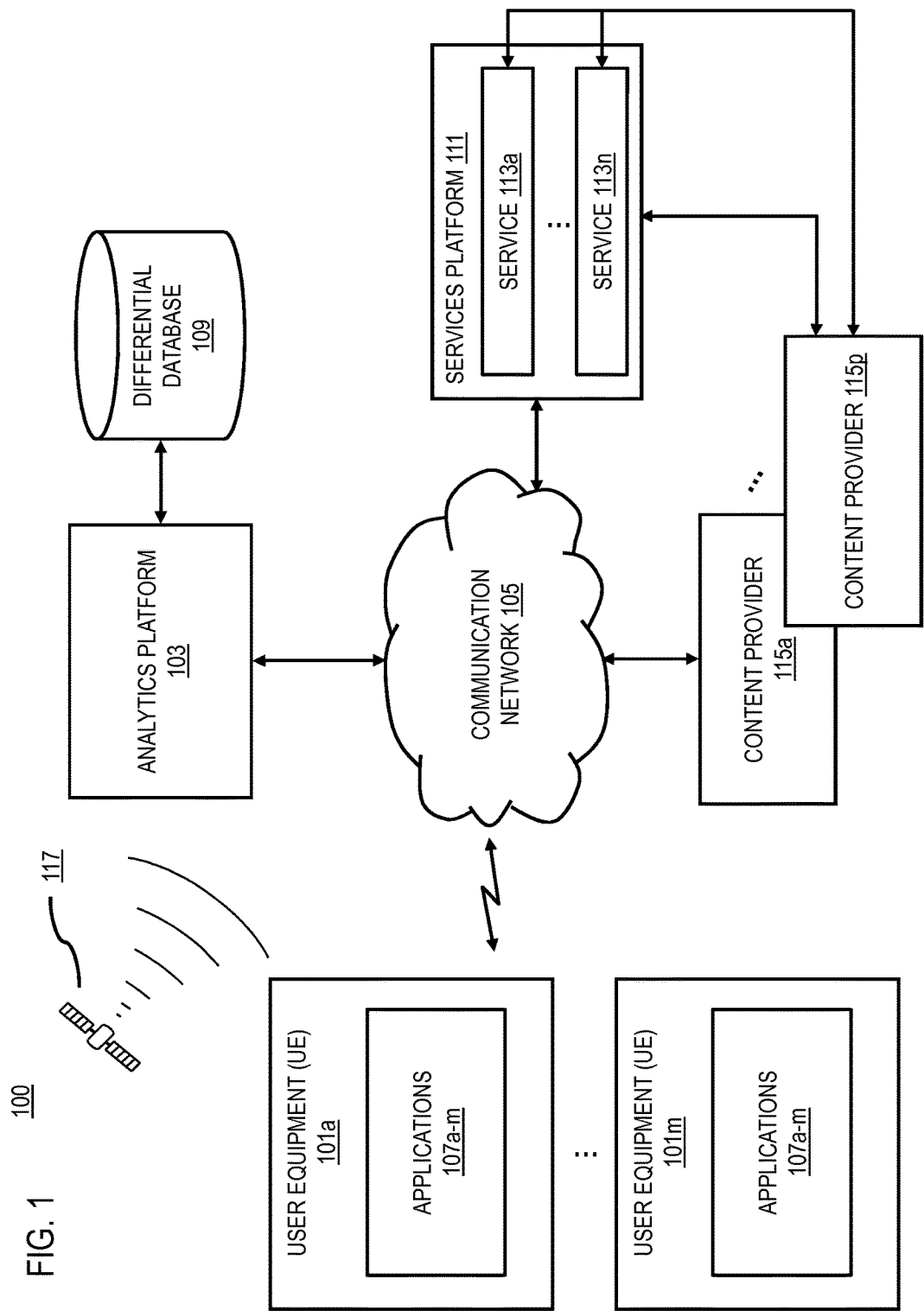
FIG. 1 is a diagram of a system capable of identifying and utilizing user experience differential information to improve a user's experience for a given application, according to one embodiment.

FIG. 1 is a diagram of a system capable of identifying and utilizing user experience differential information to improve a user's experience for a given application, according to one embodiment. As previously discussed, one area of interest among service providers and device manufacturers has been the development of software applications (e.g., games, social networking applications, web browsers, productivity applications, etc.) that can be used across a wide range of device types (e.g., mobile phones, tablets, personal computers, game consoles, etc.). Because of the differences among the device types (e.g., screen size, form factor, UI, computational resources, etc.), the user experience of interacting with the same application across multiple device types generally differs. However, identifying and utilizing these differences to achieve a more optimal level of user experience for a given application is problematic.

To address this problem, a system 100 of FIG. 1 introduces the capability to identify and utilize user experience differential information to improve a user's experience for a given application. In one embodiment, the system 100 determines one or more experience ratings associated with at least one application (e.g., a game, a word processing application, etc.), at least one subcomponent of the at least one application (e.g., a level, a task, an episode, etc.), at least one application category (e.g., sports games, productivity applications, touch-based applications, etc.), or a combination thereof with respect to one or more device types (e.g., mobile phones, tablets, game consoles, etc.). More specifically, the at least one application category comprises, at least in part, a hierarchy of the at least one application, the at least one subcomponent, or a combination thereof. By way of example, in the example use case of a video game (e.g., Super Mario Brothers) the hierarchy of the application may include the overall spatial trajectory that a particular character has to cover prior to reaching the final destination within a certain level as well one or more subtasks, one or more sublevels, one or more sub-episodes, etc. that are required to reach the final destination within the level. In the example use case of a productivity application (e.g., a word processing application), the hierarchy of the application may include the following subcomponents: (1) creating a new document; (2) typing content; (3) browsing menus; (4) using the Help function; and (5) saving the document. Based on the hierarchy of the at least one application, it is contemplated that the system 100 can determine distinct statistics for the use of the at least one application in general as well as for each subsection, subtask, sublevel, sub-episode, etc. thereof.

In one embodiment, the system 100 determines the one or more experience ratings based, at least in part, on one or more user experience attributes. In particular, the one or more user experience attributes include, at least in part, one or more performance attributes (e.g., average task completion time, error rate, score, etc.), one or more contextual attributes (e.g., location, time of the day, day of the week, etc.), one or more psychological attributes (e.g., a user's behavior during a use of an application, a user's physiological reactions during a game, etc.), one or more user perception attributes (e.g., product reviews, fan commentary, etc.), or a combination thereof. By way of example, it is contemplated that the one or more user experience ratings may be based a particular user experience attribute or on a combination of one or more user experience attributes, depending on the level of granularity determined by the system 100. In particular, the system 100 determines the one or more experience ratings, the one or more user experience attributes, or a combination thereof from one or more sources including, at least in part, one or more application use logs, social networking information (i.e., information derived from one or more social networking services), web-based information (i.e., information derived from fan and blogging websites), or a combination thereof. In one embodiment, the system 100 can determine data pertaining to the use of the at least one application from social networking information, web-based information, or a combination thereof based, at least in part, on one or more keyword or linguistic analysis techniques. Moreover, it is contemplated that the system 100 has access to one or more user accounts (e.g., a Nokia account), which allows the one or more device types own by a user to be linked by the system 100. By way of example, when a user buys a new device (e.g., a tablet), he or she can register this device with his or her account, which enables the system 100 to record the addition of the new device for this particular user. In addition, it is also contemplated that the one or more devices could also be programmed to send data to the system 100 about a purchase, an installation, and/or a use of different applications, which can allow particular software applications to be also linked to the system 100.

In one or more embodiments, the system 100 then processes and/or facilitates a processing of the one or more user experience ratings to determine user experience differential information between the one or more device types. In particular, the system 100 can identify experience differentials for each of the user experience attributes or subcomponents therefore. For example, the system 100 can determine that for Level 1 of an action game (e.g., Super Mario Brothers), the average completion time may be shorter for a user using a tablet than a user using a mobile phone.

In one embodiment, the system 100 can cause, at least in part, a generation of one or more reports for (a) presenting the experience differential information; (b) summarizing one or more differences between the one or more user experience attributes of the one or more device types; (c) summarizing one or more similarities between the one or more user experience attributes of the one or more device types; or (d) a combination thereof. By way of example, the following two tables are examples of possible reports determined by the system 100 from among the general population of users of a soccer application and a word processing application, respectively:

| SOCCER APP | Performance attributes | Contextual attributes | Psychological attributes | User perception attributes |
|---|---|---|---|---|
| Tablet | Av. num. of goals scored by user in a game: 4.3 Av. num. of special kicks implemented by user during a game: 7.5 Av. amount of time spent in coach mode: 8.1 mins. | Most typical location where game is played: home Typical time of day when game is played: evening | Strongest positive emotional response: 82% (when scoring a winning goal) Strongest stress reaction: 72% (when losing by a narrow margin) | Strength of positive appraisals on the various dimensions of the game: graphics (strong), special effects (strong), overall experience (strong) |
| Smartphone with 2.4 inch touch screen | Av. num. of goals scored by user in a game: 2.5 Av. num. of special kicks implemented by user during a game: 3.4 Av. amount of time spent in coach mode: 1.8 mins. | Most typical location where game is played: school Typical time of day when game is played: commute time | Strongest positive emotional response: 58% (when scoring the first goal) Strongest stress reaction: 64% (when losing by a narrow margin) | Strength of positive appraisals on the various dimensions of the game: graphics (medium), special effects (weak), overall experience (medium) |

| WORD PROCESSING APP | Performance attributes | Contextual attributes | Psychological attributes | User perception attributes |
|---|---|---|---|---|
| Smartphone with a 4.3 inch touch screen | Average typing speed: 2.3 words per minute Average error rate: 18.2 errors per 100 words | Most typical location where application gets used: commute Typical time of day when application gets used: morning | Strongest negative emotional response: 72% (when loosing unsaved data) | Strength of positive appraisals on the various dimensions of the application: usability (low), aesthetics (high) |
| Desktop PC with peripheral keyboard and mouse | Average typing speed: 18.8 words per minute Average error rate: 2.4 errors per 100 words | Most typical location where application is used: office Typical time of day when application is used: office hours | Strongest negative emotional response: 81% (when loosing unsaved data) | Strength of positive appraisals on the various dimensions of the application: usability (high), aesthetics (medium) |

Based on the above example reports, the system 100 can determine, for example, that when playing the soccer application on a tablet versus a smartphone with the a 2.4 inch display, the average number of goals scored is higher on the tablet than on the smartphone. Further, although the positive emotional response experienced by a user may be lower on a smartphone compared with a tablet, the level of stress experienced by the user is also reduced.

In one or more embodiments, the system 100 then determines one or more recommendations regarding which one of the one or more device types to use, to obtain, or a combination thereof for executing the at least one application, the at least one subcomponent, the application category, or a combination thereof based, at least in part, on the experience differential information. In particular, it is contemplated that the one or more recommendations generated by the system 100 may be used by the user to enhance his or her experience associated with the at least one application. More specifically, in one embodiment, the system 100 causes, at least in part, a presentation of the one or more recommendations at least substantially concurrently with a use of the at least one application, the at least one subcomponent, the at least one application category, or a combination thereof. By way of example, the system 100 may determine that a user is particularly frustrated after losing a game (e.g., using the soccer application) on his or her mobile device (e.g., a smartphone). The system 100 can then determine from the user experience differential information collected from among the population that most users experience a stronger positive emotional response when playing the soccer application on a tablet versus a mobile phone (e.g., 82% vs. 58%). Therefore, the system 100 may determine one or more corresponding recommendations (e.g., from one or more databases) to send to the user, for example, "Did you know that you are likely to score more goals with the soccer application if you play it on a tablet? Click here to see a special offer on the soccer application for a tablet and/or an offer for a tablet device."

In one embodiment, the user is determined by the system 100 to be a licensed user of a word processing program on his or her personal computer and on his or her mobile device with a 4.3 inch touch screen. However, the system 100 also determines that the user only uses the word processing program on his or her personal computer. As a result, when the system 100 determines the user is commuting to or from work (e.g., based on time, geo-location, etc.), the system 100 may determine one or more corresponding recommendations to send to the user through his or her mobile device, for example, "Did you know that word processing on a mobile phone is used mostly during the commuting context? You may want to try working on some word processing documents on your mobile phone while commuting."

In one or more embodiments, the system 100 can process and/or facilitate a processing of the at least one application (e.g., the soccer application), the at least one subcomponent of the at least one application (e.g., an exciting goal), the at least one application category, or a combination thereof to determine one or more images, one or more videos, or a combination thereof associated with the at least one application. For example, the system 100 may extract still imagery, a video, or any other multimedia item from any given sequence of the at least one application (e.g., an exciting goal). The system 100 can then determine the one or more recommendations based, at least in part, on the one or more images, the one or more videos, or a combination thereof. By way of example, the system 100 can determine that the user has just finished playing the soccer application on his or her mobile phone and that he or she is viewing his or her goals in slow motion. The system 100 can then determine one or more corresponding recommendations to send to the user, for example, "Click here to view what special tricks you could use on a tablet device to score goals." Moreover, if the user decides to view the special tricks, the system 100 can playback in slow motion a hypothetical goal using a special trick that is more likely to be actualized on a tablet device than on a mobile phone. In a further example use case, the system 100 determines that a user is using an application (e.g., a snowboarding application) for the first time on a new device type (e.g., a tablet versus a mobile phone). The system 100 then matches the responses of the user against the subcomponents of the at least one application that the user is using. For example, in the snowboarding application, performing a certain trick can feel more impressive when the user is using the game on a tablet rather than on a mobile phone. It is contemplated that a strong response in regard to a given subcomponent (e.g., performing a trick) is indicative of a highly positive user experience differential on the new device. Accordingly, the system 100 may later use this positive experience differential information in one or more recommendations to one or more other users.

In certain embodiments, the system 100 may also determine the one or more recommendations with respect to at least one user context. By way of example, in one example use case, the system 100 first determines that a user actively plays the soccer application on his or her mobile device. The system 100 then determines that the user has entered a mobile device store (e.g., a Nokia flagship store) based, at least in part, on the geo-coordinates of the store and one or more location-based technologies associated with the user's mobile device (e.g., global positioning system (GPS), cellular triangulation, Assisted GPS (A-GPS), etc.). Consequently, the system 100 can determine one or more corresponding recommendations to send to a user while he or she is in the store, for example, "The soccer application has received positive reviews on the graphics as well as the overall experience for tablet devices. Test out the soccer application for a tablet in the store now!" In another example use case, the system 100 may determine that the user is walking while using an electric book application on his or her mobile phone (e.g., based, at least in part, on an accelerometer in the device). The system 100 may then determine from the experience differential information that users read electronic books faster on tablet devices when compared to mobile phones because of the enlarged typeface, for example, and/or that many users optimize their mobile phones by manually enlarging the typeface, for example, of their electronic book applications. Consequently, the system 100 may determine one or more corresponding recommendations to send to the user, for example, "Did you know that enlarged typeface helps you to read faster? Click here to view special offers on electronic book applications for tablets and/or offers for tablets or click here to optimize the typeface settings for all electronic book applications on your mobile device."

In one embodiment, the system 100 causes, at least in part, a generation of one or more tokens (e.g., pictures, avatars, icons, etc.) for representing the user experience differential information. For example, the system 100 may determine the one or more tokens from one or more databases. Moreover, in one or more embodiments, wherein the user experience differential information is based, at least in part, on the one or more user ratings associated with at least one user, the system 100 causes, at least in part, a presentation of the one or more tokens at one or more social networking services, one or more websites (e.g., fan or blogging websites), or a combination thereof associated with the user. In one example use case, once a user has followed the one or more recommendations generated by the system 100 and has upgraded his or her user experience pertaining to the at least one application by purchasing the same application for a tablet, for example, the system 100 can automatically change the user's token on a social networking service (e.g., FACEBOOK) so that it displays the improvements in the user experience associated with a tablet as compared to a mobile phone (e.g., "the soccer application played on a tablet results in a 30% stronger emotional experience!").

As shown in FIG. 1, the system 100 comprises one or more user equipment (UE) 101a-101m (e.g. mobile phones and/or tablets) (also collectively referred to as UEs 101) having connectivity to an analytics platform 103 via a communication network 105. The UEs 101 may include or have access to one or more applications 107a-107m (also collectively referred to as applications 107). By way of example, the applications 107 may include one or more game applications (e.g., a soccer application, Super Mario Brothers, etc.), one or more productivity applications (e.g., a word processing application), one or more social networking applications, one or more media applications (e.g., an electronic book application), etc.

In one embodiment, the analytics platform 103 may include or be associated with at least one differential database 109. The analytics platform 103 may exist in whole or in part within a UE 101, or independently and the differential database 109 may exist in whole or in part within the analytics platform 103. In particular, the differential database 109 may include one or more reports pertaining to the user experience differential information, one or more user experience attributes, or a combination thereof as well as the one or more user experience attributes (e.g., performance attributes, contextual attributes, etc.). The differential database 109 may also include one or more recommendations and/or one or more tokens (e.g., pictures, avatars, icons, etc.) based, at least in part, on the experience differential information. In addition, the differential database 109 also may include information pertaining to one or more user accounts including one or more linked devices (e.g., a mobile phone, a tablet, etc.), one or more linked applications (e.g., a soccer application), or a combination thereof associated with a particular user. Further, the differential database 109 may also include one or more images, one or more videos, or a combination thereof associated with the at least one application, the at least one subcomponent of the at least one application, the at least one application category, or a combination thereof.

The UEs 101 are also connected to a services platform 111 via the communication network 105. The services platform 111 includes one or more services 113a-113n (also collectively referred to as services 113). The services 113 may include a wide variety of services such as content provisioning services for the one or more applications 107 (e.g., application updates, tokens, social networking services, etc.). In addition, the UEs 101 and the services platform 111 are also connected to one or more content providers 115a-115p (also collectively referred to as content providers 115) via the communication network 105. The content providers 115 also may provision a wide variety of content (e.g., one or more entertaining comparisons for a particular application) to the components of the system 100.

In one or more embodiments, the system 100 may utilize location-based technologies (e.g., GPS, cellular triangulation, A-GPS, etc.) to generate one or more recommendations based, at least in part, on a position relative to a UE 101. For example, the UE 101 may include a GPS receiver to obtain geographic coordinates from the satellites 117 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the analytics platform 103 determines one or more experience ratings associated with at least one application 107 (e.g., a game, a word processing application, etc.), at least one subcomponent of the at least one application 107 (e.g., a level, a task, an episode, etc.), at least one application category (e.g., sports games, productivity applications, touched-based application, etc.), or a combination thereof with respect to the UEs 101 (e.g., a mobile phone and a tablet). In particular, the at least one application 107 category comprises, at least in part, a hierarchy of the at least one application 107, the at least one subcomponent, or a combination thereof. As a result, it is contemplated that the analytics platform 103 can determine distinct statistics for the use of the at least one application 107 in general and for each subsection, subtask, sublevel, sup-episode, etc. thereof.

In certain embodiments, the analytics platform 103 determines one or more experience ratings based, at least in part, on one or more user experience attributes. As previously discussed, the one or more experience attributes may include, at least in part, one or more performance attributes, one or more contextual attributes, one or more psychological attributes, one or more user perception attributes, or a combination thereof. More specifically, the analytics platform 103 determines the one or more experience ratings, the one or more user experience attributes, or a combination thereof from one or more sources including, at least in part, one or more application 107 logs, social networking information (i.e., information derived from one or more services 113), web-based information (i.e., information derived from the services 113 or the content providers 115), or a combination thereof. By way of example, the analytics platform 103 can determine data pertaining to the use of the at least one application 107 from the services 113, the content providers 115, or a combination thereof based, at least in part, on one or more keyword or linguistic analysis techniques. Further, it is contemplated that the analytics platform 103 has access to information pertaining to one or more user accounts stored in the differential database 109, which allows the UEs 101 owned by a particular user to be linked by the analytics platform 103. Moreover, it is also contemplated that the UEs 101 could be programmed to send data to the analytics platform 103 about a purchase, an installation, and/or a use of different applications 107, which can allow particular applications 107 to be also linked to the analytics platform 103.

In one or more embodiments, the analytics platform 103 then processes and/or facilitates a processing of the one or more user experience ratings to determine user experience differential information between the UEs 101 (e.g., a mobile phone and a tablet). In particular, the analytics platform 103 can identify experience differentials for each of the user experience attributes or subcomponents thereof. For example, the analytics platform 103 can determine that for Level 1 of an action game, the average completion time may be shorter for a user using a tablet UE 101 than for a user using a mobile phone UE 101.

In one embodiment, the analytics platform 103 can cause, at least in part, a generation of one or more reports for (a) presenting the experience differential information; (b) summarizing one or more differences between the one or more user experience attributes of the one or more types of UEs 101; (c) summarizing one or more similarities between the one or more user experience attributes of the one or more types of UEs 101; or (d) a combination thereof. Based on the one or more reports, the analytics platform 103 can determine, for example, that when a user is playing a soccer application on a tablet UE 101 rather than on a mobile phone UE 101, the average number of goals scored by the user is higher on the tablet than on the mobile phone.

In one or more embodiments, the analytics platform 103 then determines one or more recommendations regarding which one of the UEs 101 to use, to obtain, or combination thereof for executing the at least one application 107, the at least one subcomponent, the application category, or a combination thereof based, at least in part, on the experience differential information. In particular, it is contemplated that the one or more recommendations generated by the analytics platform 103 may be used by a user to enhance his or her experience associated with the at least one application 107. More specifically, in one embodiment, the analytics platform 103 causes, at least in part, a presentation of the one or more recommendations at least substantially concurrently with a use of the at least one application 107, the at least one subcomponent, the at least one application category, or a combination thereof. By way of example, the analytics platform 103 may determine that a user is particular frustrated after losing a game (e.g., a soccer application 107) on his or her mobile phone UE 101. The analytics platform 103 can then determine from the user experience differential information collected from among the population and stored in the differential database 109 that most users experience a stronger positive emotional response when playing the soccer application 107 on a tablet UE 101 when compared with a mobile phone UE 101 (e.g., 82% vs. 58%). Accordingly, the analytics platform 103 may determine one or more corresponding recommendations from the differential database 109 to send to the user, for example, "Did you know that you are likely to score more goals with the soccer application 107 if you play it on a tablet UE 101? Click here to see a special offer on the soccer application 107 for a tablet and/or an offer for a tablet UE 101."

In certain embodiments, the analytics platform 103 may also determine the one or more recommendations with respect to at least one user context. By way of example, in one example use case, the analytics platform 103 first determines that a user actively plays the soccer application 107 on his or her mobile device UE 101. The analytics platform 103 then determines that the user has entered a mobile device store (e.g., a Nokia flagship store) based, at least in part, on a GPS receiver of the UE 101 and the satellites 117. Consequently, the analytics platform 103 can determine one or more corresponding recommendations from the differential database 109 to send to the user while he or she is in the store, for example, "The soccer application 107 has received positive reviews on the graphics as well as the overall experience for tablet UE 101s. Test out the soccer application for a tablet UE 101 in the store right now!" In another example use case, the analytics platform 103 may determine that the user is walking while using an electronic book application 107 on his or her mobile phone UE 101 (e.g., based, at least in part, on an accelerometer of a UE 101). The analytics platform 103 may then determine from the experience differential information in the differential database 109 that users read electronic books faster on tablet UEs 101 than they do on mobile phone UEs 101 because of the enlarged typeface, for example, and/or that many user optimize their mobile phone UEs 101 by manually enlarging the typeface of their electronic book applications 107. Consequently, the analytics platform 103 may determine one or more corresponding recommendations from the differential database 109 to send to the user, for example, "Did you know that enlarged typeface helps you to read faster? Click here to view special offers on electronic book applications 107 for tablets and/or offers on tablet UEs 101 or click here to optimize the typeface setting for all electronic book applications 107 on your mobile device UE 101."

In one or more embodiments, the analytics platform 103 can process and/or facilitate a processing of the at least one application 107 (e.g., the soccer application), the at least one subcomponent of the at least one application 107 (e.g., an exciting goal), the at least one application category, or a combination thereof to determine one or more images, one or more videos, or a combination thereof associated with the at least one application. For example, the analytics platform 103 may extract still imagery, a video, or any other multimedia item from any given sequence of the at least one application (e.g., an exciting goal). The analytics platform 103 can then determine the one or more recommendations based, at least in part, on the one or more images, the one or more videos, or a combination thereof. By way of example, the analytics platform 103 can determine that the user has just finished playing the soccer application 107 on his or her UE 101 (e.g., a mobile phone) and that he or she is viewing his or her goals in slow motion. The analytics platform 103 can then determine one or more corresponding recommendations to send to the user, for example, "Click here to view what special tricks you could use on a tablet device to score goals." Moreover, if the user decides to view the special tricks, the analytics platform 103 can playback in slow motion a hypothetical goal using a special trick that is more likely to be actualized on a tablet UE 101 than on a mobile phone UE 101.

In one embodiment, the analytics platform 103 causes, at least in part, a generation of one or more tokens (e.g., pictures, avatars, icons, etc.) for representing the user experience differential information. For example, the analytics platform 103 may also determine the one or more tokens from the services 113 and/or the content providers 115. Moreover, in one or more embodiments, wherein the user experience differential information is based, at least in part, on the one or more user ratings associated with at least one user, the analytics platform 103 causes, at least in part, a presentation of the one or more tokens at one or more services 113 (e.g., social networking services, websites, or a combination thereof) associated with the user. For example, once a use has followed the one or more recommendations from the analytics platform 103 and has upgraded his or her user experience pertaining to the at least one application 107 by purchasing the same application 107 for a tablet, the analytics platform 103 can automatically change the user's token at a service 113 (e.g., a social networking service) so that it displays the improvements in the user experience associated with a tablet UE 101 as compared to a mobile phone UE 101 (e.g., "the soccer application played on a tablet results in a 30% stronger emotional experience!").

By way of example, the UEs 101, the analytics platform 103, the applications 107, the differential database 109, the services platform 111, the services 113, the content providers 115, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
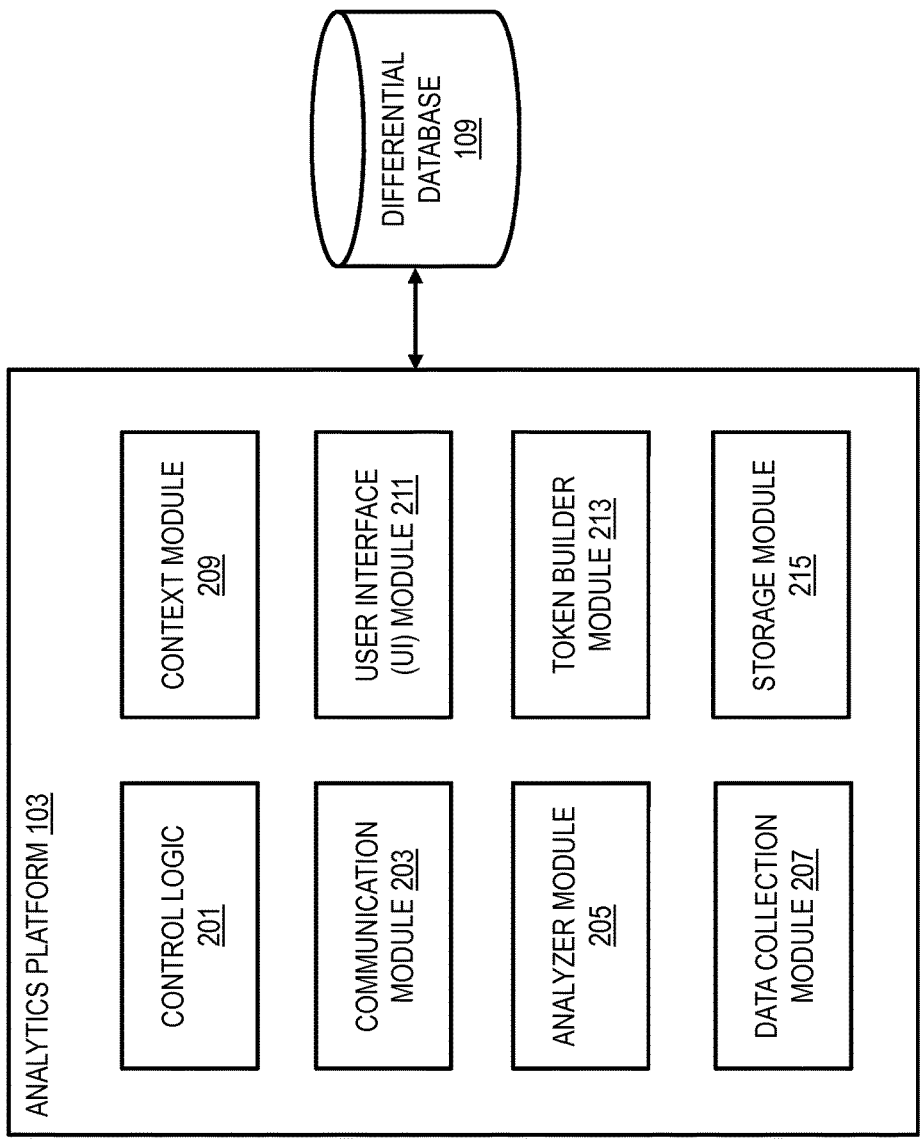
FIG. 2 is a diagram of the components of an analytics platform, according to one embodiment.

FIG. 2 is a diagram of the components of an analytics platform 103, according to one embodiment. By way of example, the analytics platform 103 includes one or more components for identifying and utilizing user experience differential information to improve a user's experience for a given application. It is contemplated that the functions of these components may be combined in one or more components or performed by other components of equivalent functionality. In this embodiment, the analytics platform 103 includes a control logic 201, a communication module 203, an analyzer module 205, a data collection module 207, a context module 209, a user interface (UI) module 211, a token builder module 213, and a storage module 215.

The control logic 201 oversees tasks, including tasks performed by the communication module 203, the analyzer module 205, the data collection module 207, the context module 209, the user interface (UI) module 211, the token builder module 213, and the storage module 215. For example, although other modules may perform the actual task, the control logic 201 may determine when and how those tasks are performed or otherwise direct the other modules to perform the task.

The communication module 203 is used for communication between the applications 107 of the UEs 101 and the analytics platform 103. The communication module 203 is also used for communications between the applications 107 and the services platform 111, the services 113, the content providers 115, the differential database 109, and the satellites 117. The communication module 203 may also be used to cause, at least in part, a generation of one or more reports for presenting the experience differential information and/or summarizing one or more differences, one or more similarities, or a combination thereof between the one or more user experience attributes of the one or more devices types. The communication module 203, in connection with the user interface module 211, also may be used to cause, at least in part, a presentation of the one or more recommendations at least substantially concurrently with a use of the at least one application, the at least one subcomponent, the at least one application category, or a combination thereof. In addition, wherein the user experience differential information is based, at least in part, on one or more user ratings associated with at least one user, the communication module 203 may also be used to cause, at least in part, a presentation of the one or more tokens at one or more social networking services, one or more websites, or a combination thereof associated with the user.

The analyzer module 205 is used to determine one or more user experience ratings associated with at least one application, at least one subcomponent of the at least one application, at least one application category, or a combination thereof with respect to one or more device types. The analyzer module 205 may also be used to determine the one or more user experience ratings based, at least in part, on one or more user experience attributes (e.g., performance attributes, contextual attributes, etc.). The analyzer module 205 also may be used to process and/or facilitate a processing of the one or more user experience ratings to determine user experience differential information between the one or more device types. By way of example, for an action game, the average completion time may be shorter for a user using a tablet device than a user using a mobile phone. In addition, the analyzer module 205 may also be used to determine one or more recommendations regarding which one of the one or more device types to use, to obtain, or a combination thereof for executing the at least one application, the at least one subcomponent, the application category, or a combination thereof based, at least in part, on the experience differential information. Further, the analyzer module 205 also may be used to determine the one or more recommendations based, at least in part, on the one or more images, the one or more videos (e.g., a video of an exciting goal), or a combination thereof.

The data collection module 207 is used to determine the one or more user experience ratings, the one or more user experience attributes, or a combination thereof from one or more sources including, at least in part, one or more application use logs, social networking information, web-based information, or a combination thereof. The data collection module 207 may also be used to process and/or facilitate a processing of the at least one application, the at least one subcomponent of the at least one application (e.g., an exciting goal), the at least one application category, or a combination thereof to determine one or more images, one or more videos, or a combination thereof associated with the at least one application.

The context module 209 is used in connection with the analyzer module 205 to determine the one or more recommendations with respect to at least one user context (e.g., a user in a user shopping in a mobile phone store, a user walking with a mobile device, etc.). As previously discussed, the user interface (UI) module 211 is used in connection with the communication module 203 to cause, at least in part, a presentation of the one or more recommendations at least substantially concurrently with a use of the at least one application, the at least one subcomponent, the at least one application category, or a combination thereof. In one embodiment, the token builder module 213, in connection with the analyzer module 205, is used to cause, at least in part, a generation of one or more tokens (e.g., pictures, avatars, icons, etc.) for representing the user experience differential information.

The storage module 215 is used to manage the storage of the one or more reports pertaining to the user experience differential information, the one or more user experience attributes, or a combination thereof as well as the one or more user experience attributes themselves (e.g., performance attributes, contextual attributes, etc.). The storage module 215 may also be used to manage the storage of the one or more recommendations. In addition, the storage module 215 also may be used to manage the storage of the one or more tokens (e.g., pictures, avatars, icons, etc.) and information pertaining to one or more user accounts (e.g., credentials, linked devices, linked applications, etc.) associated with a particular user. Further, the storage module 215 may also be used to manage the storage of one or more images, one or more videos (e.g., a video of an exciting goal), or a combination thereof associated with the at least one application, the at least one subcomponent of the at least one application, the at least one application category, or a combination thereof.

Figure 3:
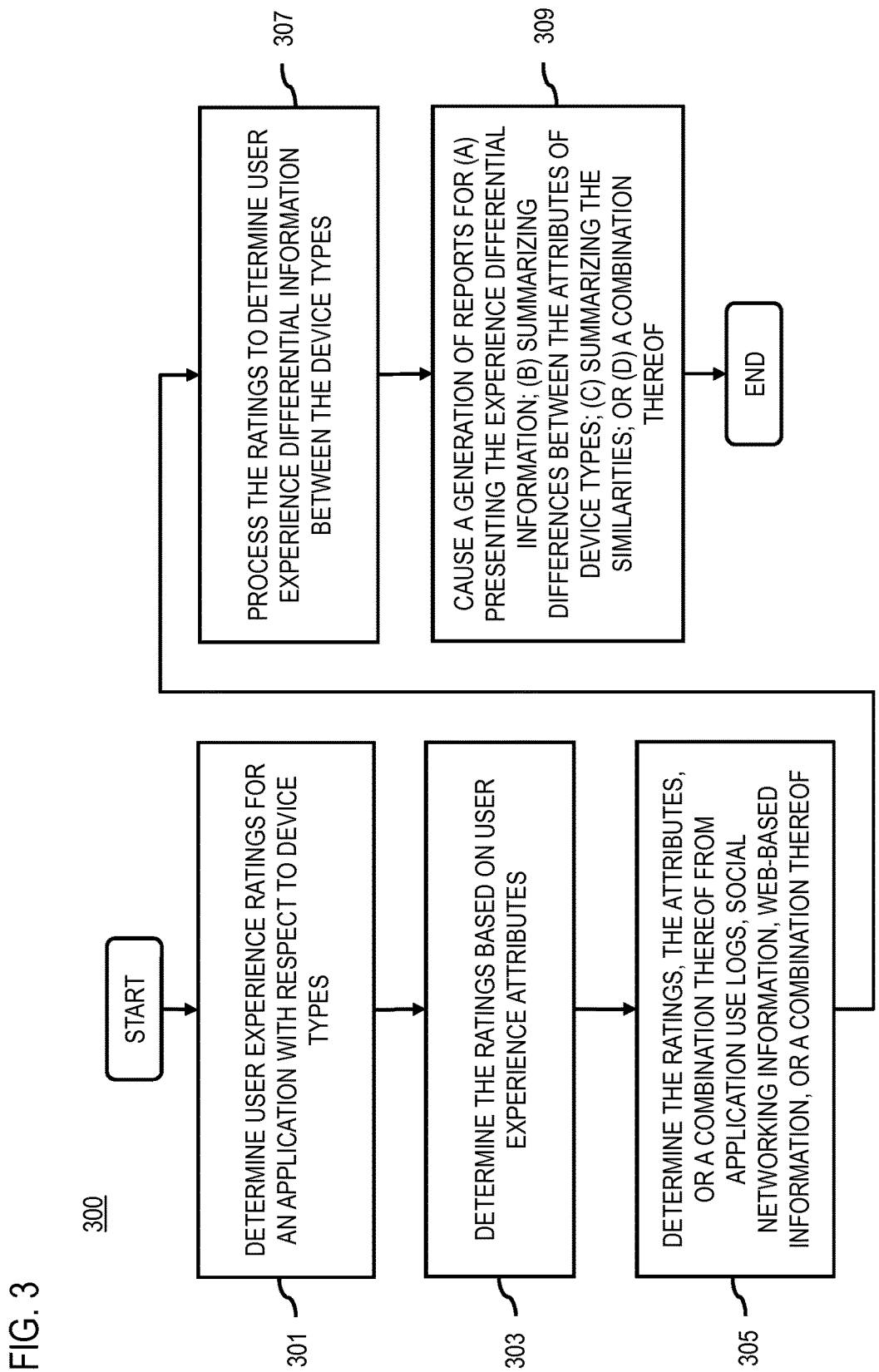
FIGS. 3-5 are flowcharts of processes for identifying and utilizing user experience differential information to improve a user's experience for a given application, according to one embodiment.
Figure 4:
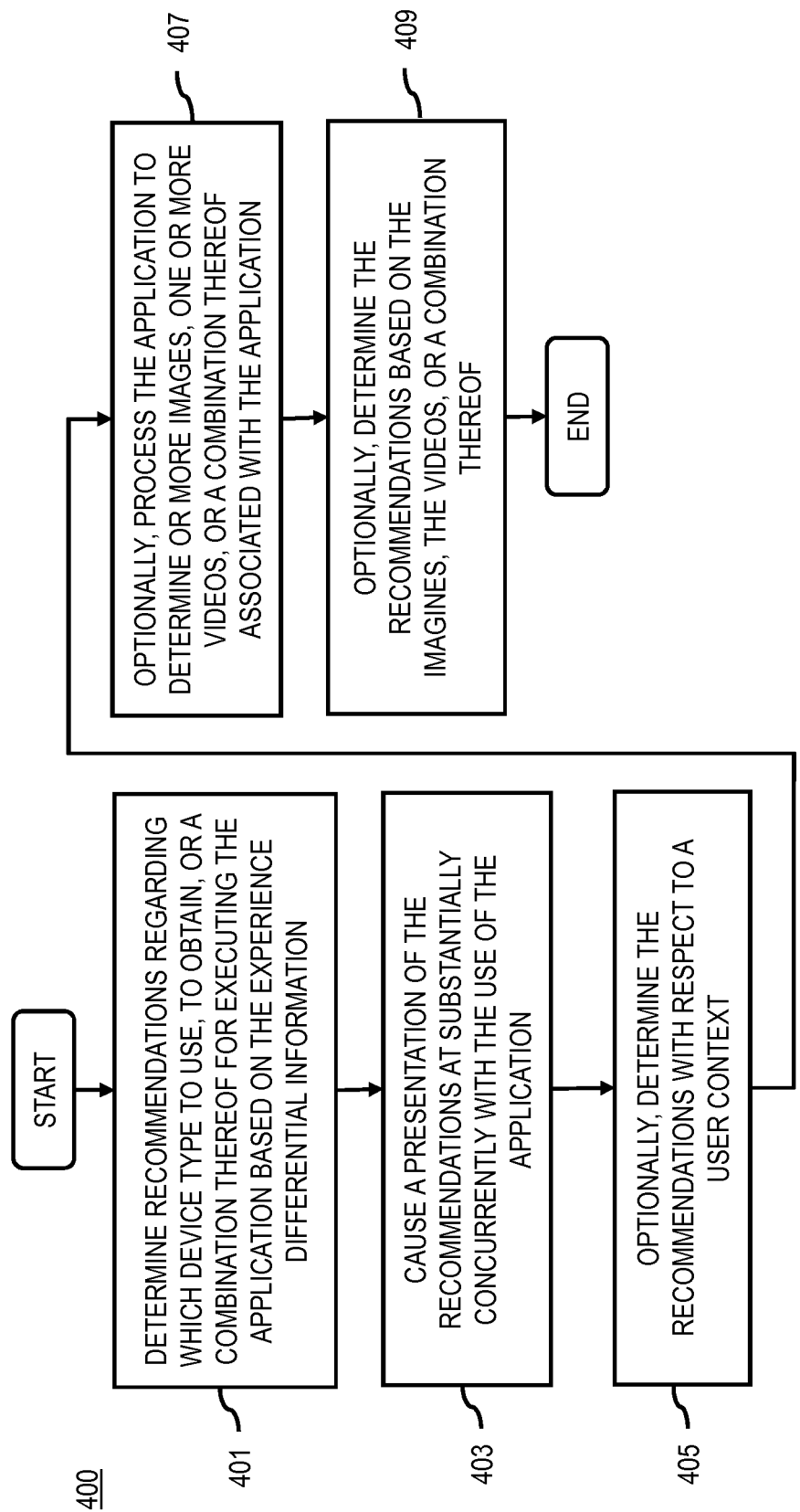
Figure 5:
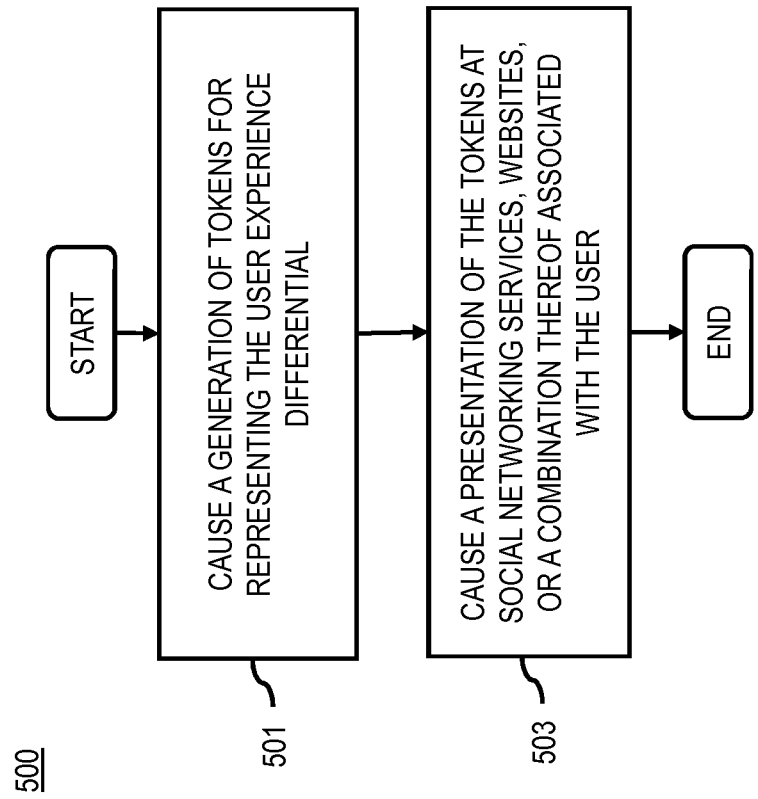
Figure 8:
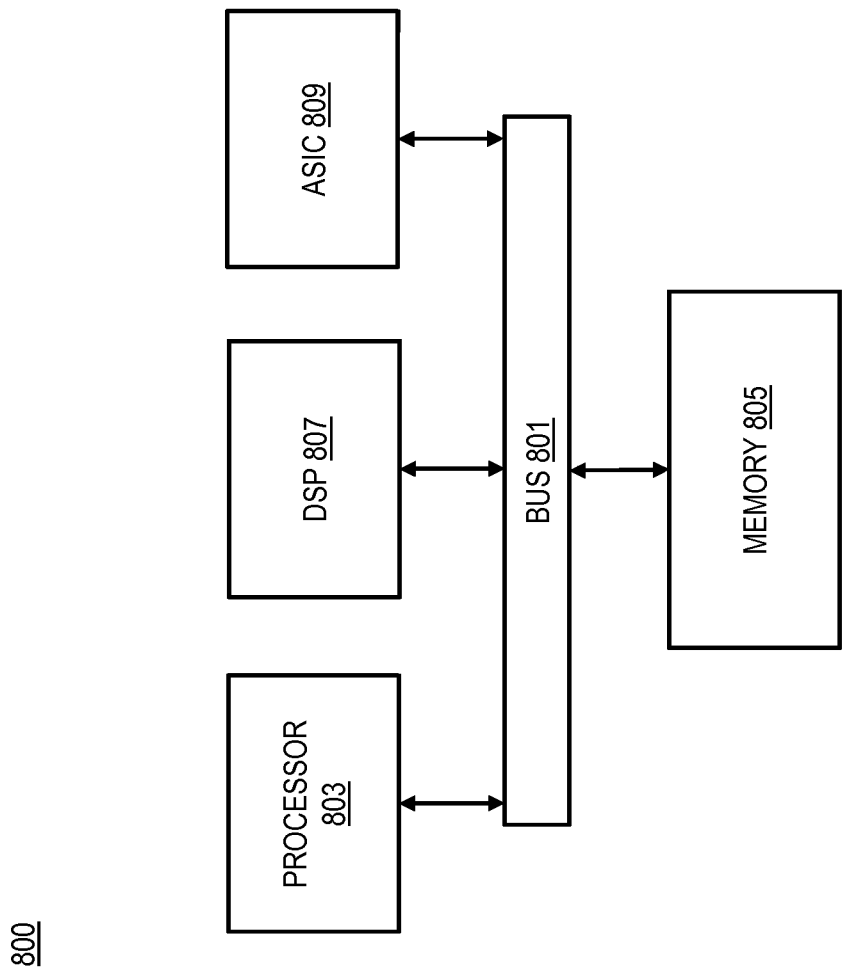
FIG. 8 is a diagram of a chip set that can be used to implement an embodiment of the invention.

FIGS. 3-5 are flowcharts of processes for identifying and utilizing user experience differential information to improve a user's experience for a given application, according to one embodiment. FIG. 3 depicts a process 300 of determining user experience ratings associated with at least one application. In one embodiment, the analytics platform 103 performs the process 300 and is implemented in, for instance, a chip set including a processor and a memory as shown in FIG. 8. In step 301, the analytics platform 103 determines one or more user experience ratings associated with at least one application, at least one subcomponent of the at least one application, at least one application category, or a combination thereof with respect to one or more device types. By way of example, the at least one application may include, at least in part, a game, a productivity application (e.g., a word processing application), etc.; the at least one subcomponent may include, at least in part, a level, a task, an episode, etc.; and the at least one application category may include, at least in part, sports games, productivity applications, touch-based applications, etc. In addition, the at least one application category comprises, at least in part, a hierarchy of the at least one application, the at least one subcomponent, or a combination thereof. For example, in the example use case of an action game (e.g., Super Mario Brothers) the hierarchy of the application may include the overall spatial trajectory that a particular character has to cover prior to reaching the final destination within certain levels as well as one or more subtasks, one or more sublevels, one or more sub-episodes, etc., that are required to reach the final destination within the level. In the example use case of a productivity application (e.g., a word processing application), the hierarchy of the application may include the following subcomponents: (1) creating a new document; (2) typing content; (3) browsing menus; (4) using the Help function; and (5) saving the document.

In step 303, the analytics platform 103 determines the one or more user experience ratings based, at least in part, on one or more user experience attributes, wherein the one or more user experience attributes include, at least in part, one or more performance attributes, one or more contextual attributes, one or more psychological attributes, one or more user experience perception attributes, or a combination thereof. By way of example, the one or more performance attributes may include, at least in part, average task completion time, error rate, score, etc.; the one or more contextual attributes may include, at least in part, location, time of day, day of the week etc.; the one or more psychological attributes may include, at least in part, a user's behavior during a use of an application, a user's physiological reactions during a game, etc.; and the one or more user perception attributes may include, at least in part, product reviews, fan commentary, etc. As previously discussed, it is contemplated that the one or more user experience ratings may be based on a single user experience attribute or on a combination of one or more user experience attributes depending on the level of granularity determined by the analytics platform 103.

In step 305, the analytics platform 103 determines the one or more user experience ratings, the one or more user experience attributes, or a combination thereof from one or more sources including, at least in part, one or more application use logs, social networking information, web-based information, or a combination thereof. By way of example, in one embodiment, each usage of the at least one application by a user and the resulting data from the usage is logged by the analytics platform 103. Further, the analytics platform 103 can determine data pertaining to the use of the at least one application from social networking information, web-based information, or a combination thereof based, at least in part, on one or more keyword or linguistic analysis techniques.

In step 307, the analytics platform 103 processes and/or facilitates a processing of the one or more user experience ratings to determine user experience differential information between the one or more device types. By way of example, the analytics platform 103 can identify experience differentials for each of the user experience attributes (e.g., performance attributes, contextual attributes, etc.) or subcomponents thereof. For example, the analytics platform 103 can determine that for Level 1 of an action game, the average completion time may be shorter for a user using a tablet device than for a user using a mobile phone.

In step 309, the analytics platform 103 causes, at least in part, a generation of one or more reports for (a) presenting the experience differential information; (b) summarizing one or more differences between the one or more user experience attributes of the one or more device types; (c) summarizing one or more similarities between the one or more user experience attributes of the one or more device types; or (d) a combination thereof. As previously discussed, the following two tables are examples of possible reports determined by the analytics platform 103 from among the general population of users of a soccer application and a word processing application, respectively:

| SOCCER APP | Performance attributes | Contextual attributes | Psychological attributes | User perception attributes |
|---|---|---|---|---|
| Tablet | Av. num. of goals scored by user in a game: 4.3 Av. num. of special kicks implemented by user during a game: 7.5 Av. amount of time spent in coach mode: 8.1 mins. | Most typical location where game is played: home Typical time of day when game is played: evening | Strongest positive emotional response: 82% (when scoring a winning goal) Strongest stress reaction: 72% (when losing by a narrow margin) | Strength of positive appraisals on the various dimensions of the game: graphics (strong), special effects (strong), overall experience (strong) |
| Smartphone with 2.4 inch touch screen | Av. num. of goals scored by user in a game: 2.5 Av. num. of special kicks implemented by user during a game: 3.4 Av. amount of time spent in coach mode: 1.8 mins. | Most typical location where game is played: school Typical time of day when game is played: commute time | Strongest positive emotional response: 58% (when scoring the first goal) Strongest stress reaction: 64% (when losing by a narrow margin) | Strength of positive appraisals on the various dimensions of the game: graphics (medium), special effects (weak), overall experience (medium) |

| WORD PROCESSING APP | Performance attributes | Contextual attributes | Psychological attributes | User perception attributes |
|---|---|---|---|---|
| Smartphone with a 4.3 inch touch screen | Average typing speed: 2.3 words per minute Average error rate: 18.2 errors per 100 words | Most typical location where application gets used: commute Typical time of day when application gets used: morning | Strongest negative emotional response: 72% (when loosing unsaved data) | Strength of positive appraisals on the various dimensions of the application: usability (low), aesthetics (high) |
| Desktop PC with peripheral keyboard and mouse | Average typing speed: 18.8 words per minute Average error rate: 2.4 errors per 100 words | Most typical location where application is used: office Typical time of day when application is used: office hours | Strongest negative emotional response: 81% (when loosing unsaved data) | Strength of positive appraisals on the various dimensions of the application: usability (high), aesthetics (medium) |

As previously discussed, based on the above example reports, the analytics platform 103 can determine, for example, that when playing the soccer application on a tablet versus a mobile phone with a 2.4 inch screen, the average number of goals scored is higher on the tablet than on the mobile phone. Further, although the positive emotional response experienced by a user maybe be lower on a smartphone compared with a tablet, the level of stress experienced by the user is also reduced.

FIG. 4 depicts a process 400 of determining one or more recommendations regarding the one or more device types. In one embodiment, the analytics platform 103 performs the process 400 and is implemented in, for instance, a chip set including a processor and a memory as shown in FIG. 8. In step 401, the analytics platform 103 determines one or more recommendations regarding which of the one or more device types to use, to obtain, or a combination thereof for executing the at least one application, the at least one subcomponent, the application category, or a combination thereof based, at least in part, on the experience differential information. As previously discussed, it is contemplated that the one or more recommendations generated by the analytics platform 103 may be used to enhance an individual user's experience associated with the at least one application (e.g., a soccer application). More specifically, in step 403, the analytics platform 103 causes, at least in part, a presentation of the one or more recommendations at least substantially concurrently with a use of the at least one application, the at least one subcomponent, the at least one application category, or a combination thereof. By way of example, the analytics platform 103 may determine that a user is particularly frustrated after losing a game (e.g., the soccer application) on his or her mobile device (e.g., a smartphone). The analytics platform 103 can then determine from the user experience differential information collected from among the population that most users experience a stronger positive emotional response when playing the soccer application on a tablet than when playing the application on a mobile phone (e.g., 82% vs. 58%). Therefore, the system 100 may determine one or more corresponding recommendations (e.g., from the differential database 109) to send to the user, for example, "Did you know that you are likely to score more goals with the soccer application if you play it on a tablet? Click here to see a special offer on the soccer application for a tablet and/or an offer for a tablet device." In step 405, the analytics platform 103 optionally determines the one or more recommendations with respect to at least one user context. By way of example, in one example use case, the analytics platform 103 first determines that a user actively plays the soccer application on his or her mobile device. The analytics platform 103 then determines that the user has entered a mobile device store (e.g., a Nokia flagship store) based, at least in part, on the geo-coordinates of the store and on one or more location-based technologies associated with the user's mobile device (e.g., GPS, cellular triangulation, A-GPS, etc.). Consequently, the analytics platform 103 can determine one or more corresponding recommendations to send to the user while he or she is in the store, for example, "The soccer application has received positive reviews on the graphics as well as the overall experience for tablet devices. Test out the soccer application for a tablet in the store right now!" In another example use case, the analytics platform 103 may determine that the user is walking while using an electric book application on his or her mobile phone (e.g., based, at least in part, on an accelerometer in the device). The analytics platform 103 may then determine from the experience differential information (e.g., in one or more databases) that users read electronic books faster on tablet devices than they do on mobile phones because of the enlarged typeface, for example, and/or that many users optimize their mobile phones by manually enlarging the typeface of their electronic book applications. Consequently, the analytics platform 103 may determine one or more corresponding recommendations to send to the user, for example, "Did you know that enlarged typeface helps you to read faster? Click here to view special offers on electronic book applications for tablets and/or offers for tablets or click here to optimize the typeface settings for all electronic book applications on your mobile device."

In step 407, the analytics platform 103 optionally processes and/or facilitates a processing of the at least one application, the at least one subcomponent of the at least one application, the at least one application category, or a combination thereof to determine one or more images, one or more videos, or a combination thereof associated with the at least one application. For example, the analytics platform 103 may extract still imagery, a video, or any other multimedia item from any given sequence of the at least one application (e.g., an exciting goal). In step 409, the analytics platform 103 optionally determines the one or more recommendations based, at least in part, on the one or more images, the one or more videos, or a combination thereof. By way of example, the analytics platform 103 can determine that the user has just finished playing the soccer application on his or her mobile phone and that he or she is viewing his or her goals in slow motion. The analytics platform 103 may then determine one or more corresponding recommendations to send to the user, for example, "Click here to view what special tricks you would be likely to use on a tablet device to score goals." Moreover, as previously discussed, if the user decides to view the special tricks, the analytics platform 103 can playback in slow motion a hypothetical goal using a special trick that is more likely to be actualized by the user while using a tablet device.

FIG. 5 depicts a process 500 of generating one or more identity tokens. In one embodiment, the analytics platform 103 performs the process 500 and is implemented in, for instance, a chip set including a processor and a memory as shown in FIG. 8. In step 501, the analytics platform 103 causes, at least in part, a generation of one or more tokens for representing the user experience differential information. By way of example, the one or more tokens may include, at least in part, one or more pictures, one or more avatars, one or more icons, etc. In step 503, wherein the user experience differential information is based, at least in part, on the user one or more user ratings associated with at least one user, the analytics platform 103 causes, at least in part, a presentation of the one or more tokens at one or more social networking services, one or more websites, or a combination thereof associated with the user. By way of example, the one or more websites may include one or more fan websites or one or more blogging websites. Further, in one example use case, once a user has followed the one or more recommendations from the analytics platform 103 and has upgraded his or her user experience pertaining to at least one application (e.g., the soccer application) by purchasing the same application for a tablet, the analytics platform 103 can automatically change the user's token on a social networking service (e.g., FACEBOOK) so that it displays the improvements in the user experience associated with a tablet as compared to a mobile phone (e.g., "the soccer application played on a tablet results in a 30% stronger emotional experience!").

Figure 6B:
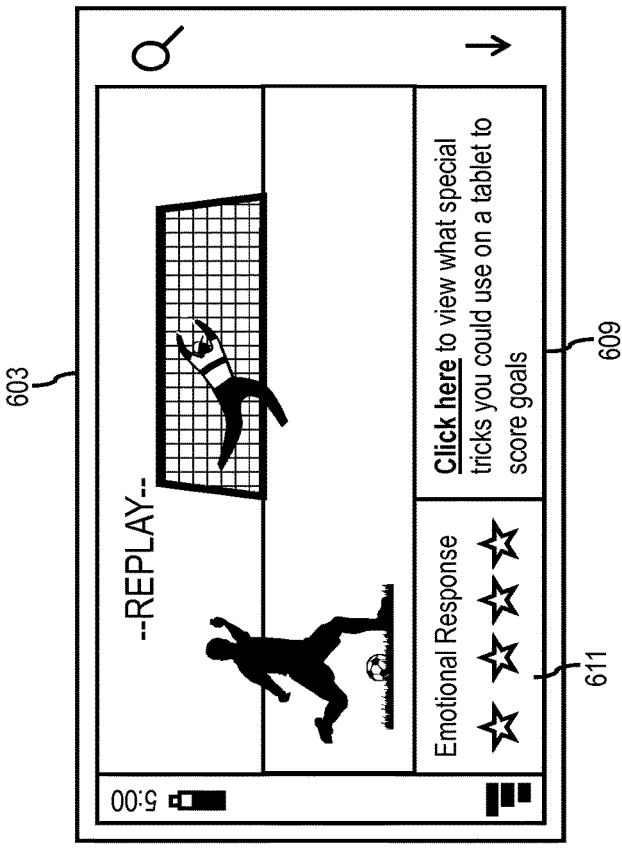
FIGS. 6A and 6B are diagrams of user interfaces utilized in the processes of FIGS. 3-5, according to various embodiments.
Figure 6A:
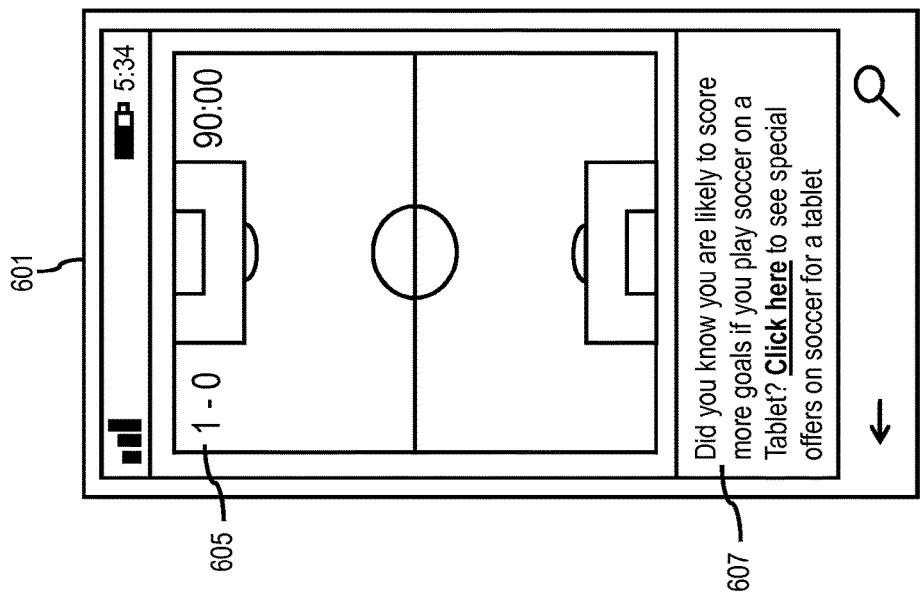

FIGS. 6A and 6B are diagrams of user interfaces utilized in the processes of FIG. 3-5, according to various embodiments. As shown, the example user interfaces of FIGS. 6A and 6B include one or more user interface elements and/or functionalities created and/or modified based, at least in part, on information, data, and/or signals resulting from the processes (e.g., processes 300, 400, and 500) described with respect to FIGS. 3-5. More specifically, FIG. 6A illustrates a user interface (e.g., interface 601) of a mobile device (e.g., a mobile phone) depicting a soccer application. In particular, interface 601 depicts the end of a 1-0 soccer game played by a user during his or her commute home from work. As previously discussed, in one embodiment, the system 100 determines one or more experience ratings or scores associated with the soccer application, at least one subcomponent of the soccer application (e.g., a level), at least one category of the at least one application category (e.g., sports games), or a combination thereof with respect to one or more device types (e.g., a mobile phone, a tablet, etc.). In particular, the system 100 determines the one or more experience ratings based, at least in part, on one or more user experience attributes (e.g., performance attributes, contextual attributes, etc.). In this example use case, the system 100 determines that the user scored only one goal during the use of the application as shown by the representation of the score 605. In this example use case, the system 100 determines from the user experience differential information collected from among the population that most users experience a stronger positive emotional response when playing the soccer application on a tablet versus a mobile phone (e.g., 82% vs. 58%). Accordingly, the system 100 may generate one or more corresponding recommendations to the user, for example recommendation 607, "Did you know you are likely to score more goals if you play soccer on a tablet? Click here to see special offers on soccer for a tablet." In particular, it is contemplated that the one or more recommendations (e.g., recommendation 607) may be used by the user to enhance his or her experience with the at least one application (e.g., the soccer application).

FIG. 6B illustrates a user interface 603 of a mobile device (e.g., a mobile phone) depicting a soccer application. In particular, interface 603 depicts a replay of a goal scored by a user during a use of the soccer application. In this example use case, the system 100 can determine that the user has just finished playing the soccer application and is viewing his or her goals in slow motion through the interface 603. The system 100 can then process and/or facilitate a processing of the soccer application, the at least one subcomponent of the at least one application (e.g., an exciting goal), the application category, or a combination thereof to determine one or more images, one or more videos (e.g., a video of the exciting goal), or a combination thereof associated with the soccer application. In particular, the system 100 can extract still imagery, a video, or any other multimedia item of any given sequence of the soccer application. Further, the system 100 may determine the one or more recommendations based, at least in part, on the one or more images, the one or more videos (e.g., a video of the exciting goal), or a combination thereof. For example, in this example use case, the system 100 presents to the user the corresponding recommendation 609 that states, "Click here to view what special tricks you could use on a tablet to score goals." Moreover, if the user decides to view the special tricks, then the system 100 can playback in slow motion a hypothetical goal using a special trick that is more likely to be actualized by the user using a tablet device. In addition, the system 100 can determine one or more user experience attributes (e.g., psychological attributes) associated with the soccer application, the at least one subcomponent of the application (e.g., an individual game or an individual score), at least one application category, or a combination thereof by allowing the user to rate the experience using the rating feature 611. In addition, the system 100 can use the information determined from the rating feature 611 to confirm that the user's individual experience is the same as the user experience differential information determined by the system 100 from among the general population of users of the same soccer application.

The processes described herein for identifying and utilizing user experience differential information to improve a user's experience for a given application may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
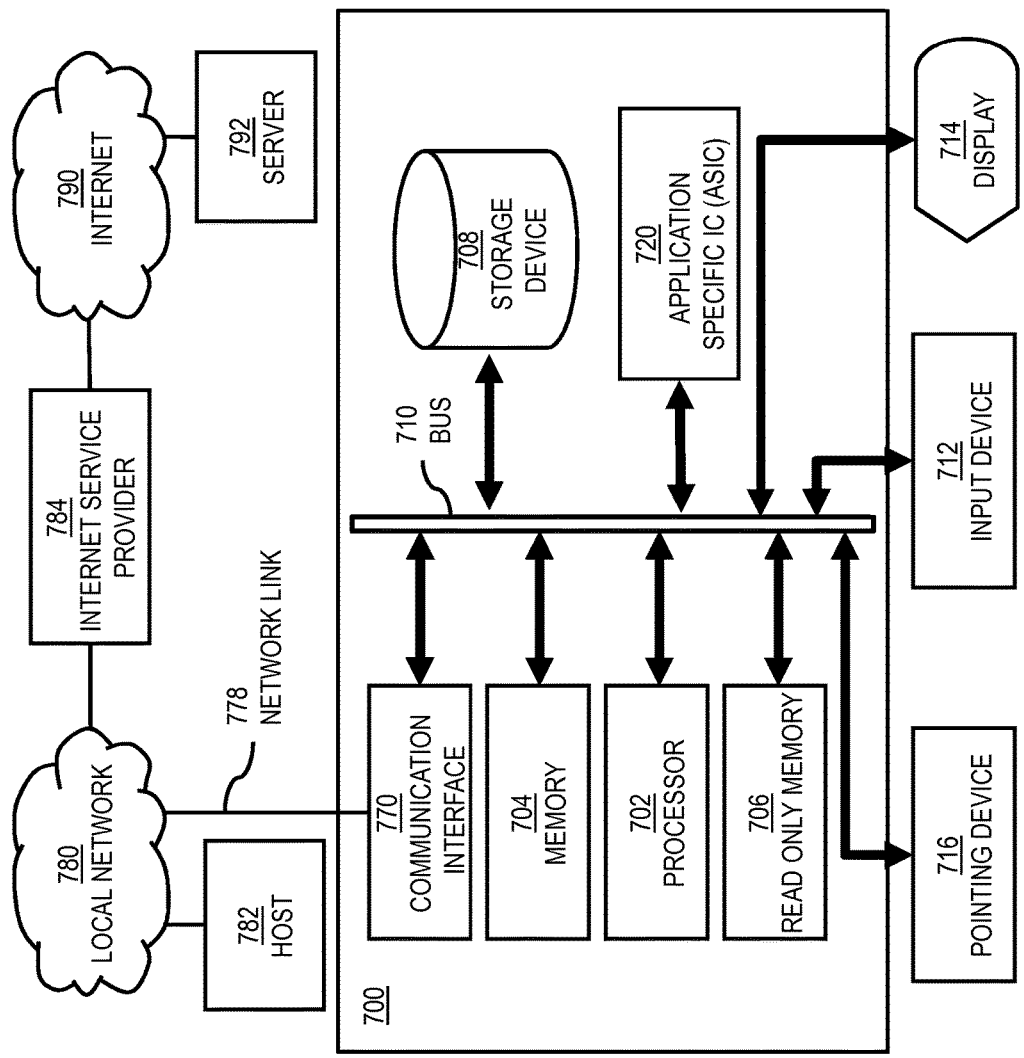
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to identify and to utilize user experience differential information to improve a user's experience for a given application as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of identifying and utilizing user experience differential information to improve a user's experience for a given application.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to identify and to utilize user experience differential information to improve a user's experience for a given application. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for identifying and utilizing user experience differential information to improve a user's experience for a given application. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for identifying and utilizing user experience differential information to improve a user's experience for a given application, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for identifying and utilizing user experience differential information to improve a user's experience for a given application to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to identify and to utilize user experience differential information to improve a user's experience for a given application as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of identifying and utilizing user experience differential information to improve a user's experience for a given application.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to identify and to utilize user experience differential information to improve a user's experience for a given application. The memory 805 also stores the data associated with or generated by the execution of the inventive steps.

Figure 9:
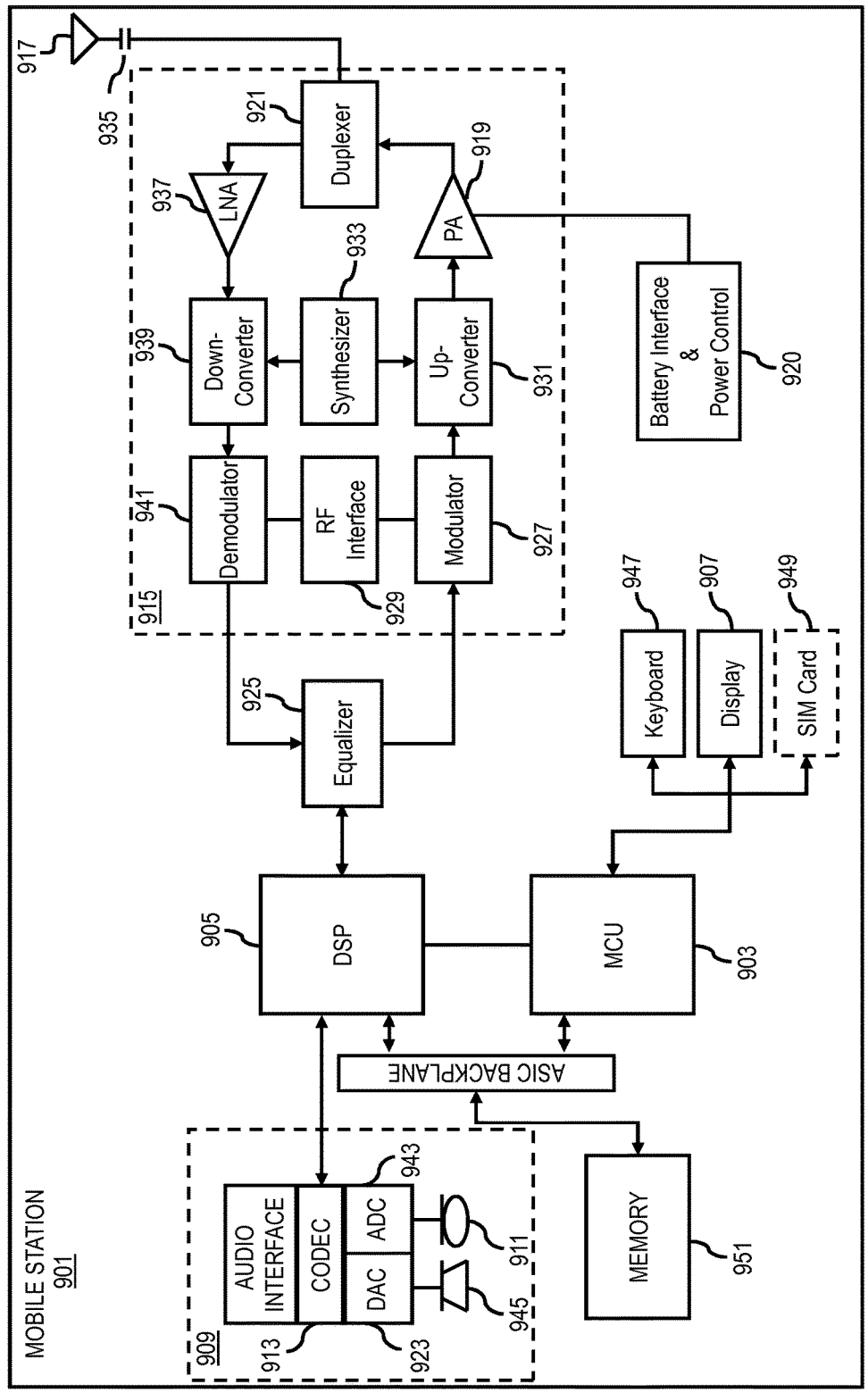
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of identifying and utilizing user experience differential information to improve a user's experience for a given application. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of identifying and utilizing user experience differential information to improve a user's experience for a given application. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to identify and to utilize user experience differential information to improve a user's experience for a given application. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    associating an application, by a server configured to provide an analytics platform, to a plurality of devices of different types based on information provided by each of the plurality of devices, wherein each of the plurality of devices includes one or more sensors;
    collecting data, by the server, relating to usage of an application by a user on the plurality of devices, wherein the data originates, in part, from the one or more sensors, and specifies user experience attributes for the application;
    determining, using the server, rating information about user experience for the application based on the collected data for the plurality of devices; and
    processing, using the server, the rating information to determine user experience differential information that captures differences in the user experience attributes for the application with respect to the plurality of devices.

2. A method of claim 1,
    wherein the user experience attributes include one or more performance attributes that specify performance metrics in executing the application, one or more contextual attributes that specify location or time associated with execution of the application, one or more psychological attributes that specify behavior of the user associated with execution of the application, one or more user experience perception attributes that specify opinion about the application, or a combination thereof, the method further comprising:
    establishing connection with each of the plurality of devices to collect the data.

3. A method of claim 1, comprising:
    retrieving the data over a communication network from one or more sources including one or more application use logs, social networking information, web-based information, or a combination thereof.

4. A method of claim 1, comprising:
    generating one or more reports relating to the experience differential information; the user experience attributes; or a combination thereof.

5. A method of claim 1, comprising:
    generating a recommendation for the user based on the experience differential information; and
    initiating transmission of the recommendation to one of the plurality of devices.

6. A method of claim 5, comprising:
    presenting the recommendation to the one device while the one device is executing the application.

7. A method of claim 6, comprising:
    determining context information for the user with respect to the one device, wherein the recommendation is generated based further on the context information.

8. A method of claim 5, comprising:
    capturing one or more images, one or more videos, or a combination thereof associated with the application, wherein the recommendation is generated based further on the context information,
    wherein the recommendation is generated based further on the context information based on the one or more images, the one or more videos, or a combination thereof.

9. A method of claim 1, comprising:
    generating one or more tokens for representing the user experience differential information, wherein the one or more tokens include a picture, an avatar, or an icon; and
    presenting the one or more tokens at one or more social networking services, one or more websites, or a combination thereof associated with the user.

10. A method of claim 9, comprising:
    generating an updated token for the user in response to acquisition of a version of the application, the version being different from an original version of the application; and
    publishing the updated token with the one or more social networking services, or the one or more websites.

11. An apparatus comprising:
at least one processor; and
at least one memory including computer program code for one or more programs,
the at least one memory and the computer program code configured to, with the at least one processor, cause the apparatus to perform at least the following,
associate an application to a plurality of devices of different types based on information provided by each of the plurality of devices, wherein each of the plurality of devices includes one or more sensors;
collect data, by the server, relating to usage of an application by a user on the plurality of devices, wherein the data originates, in part, from the one or more sensors, and specifies user experience attributes for the application;
determine rating information about user experience for the application based on the collected data for the plurality of devices; and
process the rating information to determine user experience differential information that captures differences in the user experience attributes for the application with respect to the plurality of devices.

12. An apparatus of claim 11,
wherein the user experience attributes include one or more performance attributes that specify performance metrics in executing the application, one or more contextual attributes that specify location or time associated with execution of the application, one or more psychological attributes that specify behavior of the user associated with execution of the application, one or more user experience perception attributes that specify opinion about the application, or a combination thereof.

13. An apparatus of claim 11, wherein the apparatus is further caused to:
determine retrieving the data over a communication network from one or more sources including, at least in part, one or more application use logs, social networking information, web-based information, or a combination thereof.

14. An apparatus of claim 12, wherein the apparatus is further caused to:
cause, at least in part, a generation of one or more reports relating to the experience differential information; the user experience attributes; or a combination thereof.

15. An apparatus of claim 11, wherein the apparatus is further caused to:
generating a recommendation for the user based on the experience differential information; and
initiate transmission of the recommendation to one of the plurality of devices.

16. An apparatus of claim 15, wherein the apparatus is further caused to:
cause, at least in part, a presentation of the recommendation to the one device while the one device is executing the application.

17. An apparatus of claim 16, wherein the apparatus is further caused to:
determine context information for the user with respect to the one device, wherein the recommendation is generated based further on the context information.

18. An apparatus of claim 15, wherein the apparatus is further caused to:
determine one or more images, one or more videos, or a combination thereof associated with the application, wherein the recommendation is generated based further on the context information,
wherein the recommendation is generated based further on the context information based on the one or more images, the one or more videos, or a combination thereof.

19. An apparatus of claim 11, wherein the apparatus is further caused to:
generate of one or more tokens for representing the user experience differential information, wherein the one or more tokens include a picture, an avatar, or an icon; and
present the one or more tokens at one or more social networking services, one or more websites, or a combination thereof associated with the user.

20. An apparatus of claim 19, wherein the user experience differential information is based, at least in part, on the user one or more user ratings associated with at least one user, and wherein the apparatus is further caused to:
generate an updated token for the user in response to acquisition of a version of the application, the version being different from an original version of the application; and
publish the updated token with the one or more social networking services, or the one or more websites.

* * * * *